United States Patent
Eiron et al.

(10) Patent No.: US 7,251,654 B2
(45) Date of Patent: Jul. 31, 2007

(54) SYSTEM AND METHOD FOR RANKING NODES IN A NETWORK

(75) Inventors: Nadav Eiron, San Jose, CA (US); Kevin Snow McCurley, San Jose, CA (US); John Anthony Tomlin, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 10/847,164

(22) Filed: May 15, 2004

(65) Prior Publication Data

US 2005/0256860 A1 Nov. 17, 2005

(51) Int. Cl.
*G06F 17/30* (2006.01)
*G06F 17/00* (2006.01)

(52) U.S. Cl. ...................... 707/7; 707/104.1
(58) Field of Classification Search ............ 707/5, 707/7, 10, 104.1, 205; 715/501.1
See application file for complete search history.

(56) References Cited

U.S. PATENT DOCUMENTS

2005/0216533 A1* 9/2005 Berkhin ................. 707/204

OTHER PUBLICATIONS

Langville et al, "Updating PageRank with Iterative Aggregation", WWW2004, May 17-22, 2004, ACM 1-58113-912-08/04/0005, pp. 392-393.*
Kamvar et al, "Extrapolation Methods for Accelerating PageRank Computations", WWW2003, May 20-24, 2003, ACM 1-58113-680-3/03/0005, pp. 261-270.*
Ian Rogers, "The Google Pagerank Algorithm and How It Works," available at: http://WWW.iprcom.com/papers/pagerank/, on Jan. 27, 2004, 18 pages.

"Holy smokes Batman, that is a Huge # of links," Apr. 4, 2003, available at: http://WWW.webmasterworld.com/forum_12/748-2-15.htm, on Mar. 22, 2004, 7 pages.
"Edutech LMS Evaluation: Report," available at: http://WWW.edutech.ch/edutech/tools/ev2showreport.php?details=1&critdescr=1&compid0 . . . , on Mar. 22, 2004, 28 pages.
Gisli Hjaltason et al., "Using Spatial Sorting and Ranking in Model-Based Object Recognition," 1998, 11 pages.
"Depth vs. Breadth," available at: http://WWW.webmasterworld.com/forum10003/2924.htm, on Mar. 22, 2004, 6 pages.
Rethinking Drupal's meta tags beyond version 3, available at: http://www.drupal.org/node/view/55, on Mar. 22, 2004, 24 pages.
J.Scott Olsson, "Categorization for MALACH AMSC 663, Semester Progress Report," olsson@math.umd.edu, available at: http://www.math.umd.edu/~olsson/amsc663/docs/prop-talk.pdf, on May 15, 2004, 36 pages.

* cited by examiner

*Primary Examiner*—Uyen Le
(74) *Attorney, Agent, or Firm*—Samuel A. Kassatly

(57) ABSTRACT

A dangling web page processing system ranks dangling web pages on the web. The system ranks dangling web pages of high quality that cannot be crawled by a crawler. In addition, the system adjusts ranks to penalize dangling web pages that return errors when links on the dangling web pages are crawled. By providing a rank for dangling web pages, the present system allows the concentration of crawling resources on those dangling web pages that have the highest rank in the uncrawled region. The system operates locally to the dangling web pages, providing efficient determination of ranks for the dangling web pages. The system explicitly discriminates against web pages on the basis of whether they point to penalty pages, i.e., pages that return an error when a link is followed. By incorporating more fine-grained information such as this into ranking, the system can improve the quality of individual search results and better manage resources for crawling.

32 Claims, 9 Drawing Sheets

SYSTEM AND METHOD FOR RANKING NODES IN A NETWORK

CROSS-REFERENCE TO RELATED APPLICATION

The present application is related to co-pending application, titled "System and Method for Ranking Logical Directories," Ser. No. 10/847,143, which is filed on the same date as the present application, and which is incorporated herein by reference in its entirety.

FIELD OF THE INVENTION

The present invention generally relates to ranking nodes in a directed graph representing an information network. Examples of such graphs include, but are not limited to, directories, subdirectories, and files in a logical directory such as an index produced by crawling the WWW, trust networks between people, or citation graphs. In particular, the present invention relates to a method for ranking dangling nodes, namely those nodes that have no outlinks, or whose outlinks are inaccessible to the ranking processor. Further, the present invention relates to a method for penalizing a node has outlinks to "penalty nodes", defined as nodes that reflect negatively on other nodes that endorse them.

BACKGROUND OF THE INVENTION

Graphs are used in the representation and analysis of many information structures. Ranking nodes in such graphs by their quality or importance is of great value. For example, the World Wide Web (WWW) is comprised of an expansive network of interconnected computers upon which businesses, governments, groups, and individuals throughout the world maintain inter-linked computer files known as web pages. Users navigate these web pages by means of computer software programs commonly known as Internet browsers. Due to the vast number of WWW sites, many web pages have a redundancy of information or share a strong likeness in either function or title. The vastness of the unstructured WWW causes users to rely primarily on Internet search engines to retrieve information or to locate businesses. These search engines use various means to determine the relevance of the information retrieved to a user-defined search. Thus, ranking of web pages by their importance or authoritativeness is an important task.

A typical search engine has an interface where the user enters an alphanumeric search expression or keywords. The search engine sifts through available web sites for the search terms, and returns the search results in the form of web pages in, for example, HTML. Each search result comprises a list of individual entries that have been identified by the search engine as satisfying the search expression. Each entry or "hit" comprises a hyperlink that points to a Uniform Resource Locator (URL) location or web page.

An exemplary search engine is the Google® search engine. An important aspect of the Google® search engine is the ability to rank web pages according to the authority of the web pages with respect to a search query. One of the ranking techniques used by the Google® search engine is the PageRank algorithm. Reference is made to L. Page, et al., "The PageRank citation ranking: Bringing order to the web," Technical report, Stanford Digital Library Technologies Project, 1998. Paper SIDL-WP-1999-0120. The PageRank algorithm calculates a stationary distribution of a Markov chain induced by hyperlink connectivity on the WWW. This same technique used by the PageRank algorithm applies to other directed graphs where edges or links imply endorsement or trust.

In addition to scoring of pages on the world wide web, the technique of PageRank also applies to scoring of nodes in other types of networks. Examples include the scoring of patents by the scores of other patents that contain citations to it, the scoring of scientific literature that contains bibliographic citations, and the scoring of trust among individuals using the knowledge of trust relations between individuals.

Although the PageRank algorithm has proven to be useful, and is applicable to other information graphs as well as the Web, it would be desirable to present additional improvements. In many graphs, including the web, nodes may either have no outlinks or their outlinks are not accessible to a ranking processor; these nodes are known as "dangling nodes". A node may be dangling for a variety of reasons. For example, in the context of the web graph, the web page may have not yet been crawled. In other cases, the node may genuinely have no outlinks, etc.

A web page is further considered a dangling web page when protected by a robots.txt file. Use of a robots.txt file by a web page places the web page "off-limits" under a standard practice of crawling. However, such web pages may comprise high-quality information that is of great interest to readers and worthy of indexing.

In certain cases, particularly in the context of World Wide Web analysis, ranking of certain kinds of dangling nodes might be particularly important. For instance, some web pages become dangling when they are deleted from the web by their author. Paradoxically, there may be very good reasons to calculate a rank of a web page that was deleted (e.g., a significant document that was removed for political or legal reasons).

Even if a web page cannot be crawled, it can still be indexed using its anchor text. While anchor text is not a substitute for full text indexing, it has proved to be remarkably effective in satisfying most web search queries. Reference is made to N. Craswell, et al., "Effective site finding using link anchor information," In *Proc. of the 24th annual international ACM SIGIR conference on research and development in information retrieval*, web pages 250-257, New Orleans, La., USA, September 2001, Association for Computing Machinery; N. Eiron, et al., "Analysis of anchor text for web search," In *Proc. of 26th ACM SIGIR*, web pages 459-460, 2003; and R. Fagin, et al., "Searching the workplace web," In *Proc. 12th World Wide Web Conference*, Budapest, 2003.

Another source of dangling nodes is nodes that have no outlinks. For example, in the Web graph, most PostScript and PDF files on the web contain no embedded outlinks, yet the content may be of relatively high quality. A URL may also be a dangling web page if it has a meta tag requesting that links not be followed from the web page. Further, a URL may be a dangling web page if it requires authentication (e.g., most of the Wall Street Journal site). Other reasons for dangling web pages comprise those links to pages that return a 500-class or 400-class error response at crawl time indicating that the web page is not available. Furthermore, some links may point to servers that are not resolvable in DNS, experience routing problems, etc. A 400-class error response comprises non-existent web pages, web pages requiring a password for access, etc. A 500-class error response comprises configuration problems, load problems, etc. In other information graphs, similar situations exist. In a citation graphs for scientific literature, for example, some works may only cite other works that are outside the field being analyzed. In a trust network, some of the nodes may represent people for which the list of people they trust is unavailable.

Conventional graph ranking techniques treat all types of dangling nodes identically. Conventional graph ranking techniques remove dangling nodes from the graph before calculating the ranking and then add the dangling nodes back into the graph ranking analysis. Reference is made to L. Page, et al., "The PageRank citation ranking: Bringing order to the web," Technical report, Stanford Digital Library Technologies Project, 1998. Paper SIDL-WP-1999-0120 (version of Nov. 11, 1999); and S. Kamvar, et al., "Exploiting the block structure of the web for computing pagerank," Technical report, Stanford University, 2003.

Another conventional graph ranking technique removes the dangling nodes entirely. Reference is made to S. Brin, et al., "What can you do with a web in your pocket?," *Data Engineering Bulletin,* 21:37-47, 1998; and T. Haveliwala, "Efficient computation of pagerank," Technical report, Stanford University, 1999. Removing the dangling nodes entirely skews the results on the non-dangling nodes somewhat since the outdegrees from the non-dangling nodes are adjusted to reflect the lack of links to dangling nodes.

Conventional approaches to ranking with dangling nodes do not account for the various types of dangling nodes. Further, the effect of the dangling nodes is not propagated to other parts of the graph, neglecting the effect of the dangling nodes on the rankings of non-dangling nodes. Moreover, if a decision needs to be made on how to further explore a partial graph with limited resources, such as in the case of a web crawler that needs to decide which links to dangling web pages should be followed first in its crawl strategy, it becomes important to assign ranks to dangling web pages to efficiently manage crawling resources. Reference is made to S. Abiteboul, et al., "Adaptive on-line web page importance computation," In *Proc.* 12*th World Wide Web Conference,* web pages 280-290, 2003; and J. Cho, et al., "Efficient crawling through url ordering," In *Proc. of* 7*th World Wide Web Conference,* 1998.

In certain information network graphs it appears that there is a growing trend toward "node rot", where certain nodes that used to be valuable turn out to later reflect negatively on nodes linking to them. For example, in a graph for patent citations, when a patent is invalidated, the ranking of patents citing it should probably be degraded. In the case of the Web graph, several studies have forecast the half-life of a URL at between four and five years. When a page is deleted, links that point to it will become "broken". The existence of broken links on a page may be taken to be an indication of low standards on part of its author. Reference is made to J. Markwell, et al., "Link rot limits the usefulness of web-based educational materials in biochemistry and molecular biology," *Biochem. Mol. Biol. Educ.,* 31:69-72, 2003; and D. Spinellis, "The decay and failures of web references," *Comm. ACM,* 46(l): 71-77, 2003. In one crawl of over a billion web pages approximately 6% of all web pages returned a 404 HTTP error code. These presumably reflect a fraction of web pages that are no longer maintained or were poorly authored. As time passes, this problem will only worsen as an increasing fraction of web pages on the web fall into disrepair.

Dangling nodes may also appear in other types of networks besides the world wide web. Examples include scientific papers that cite no other papers, patents that cite no other patents, or people who trust nobody else. In addition, other types of networks may have nodes that qualify as penalty nodes. An example is provided in trust networks between individuals, in which a person may have expressed trust in a person who is convicted of a crime. In this case, the person who trusted the criminal may themselves have their own trust level decreased in acknowledgment of their ill advised trust in the criminal. Another example is provided in scientific literature that cites a paper that is later discredited for some reason (e.g., fraudulent data or improper experimental methodology). In this case, the discredited literature becomes a penalty node, and papers that cite it for their own evidence may have their score decreased accordingly.

What is therefore needed is a system, a computer program product, and associated methods for: (a) ranking dangling nodes in a graph; and (b) adjusting the rank of "penalty pages". The need for such a solution has heretofore remained unsatisfied.

SUMMARY OF THE INVENTION

The present invention satisfies this need, and presents a system, a computer program product, and an associated method (collectively referred to herein as "the system" or "the present system") for ranking dangling nodes in a graph. The present system ranks dangling nodes of high quality, such as web pages that cannot be crawled by a crawler. In addition, the present system adjusts ranks to penalize nodes that have outlinks to nodes that are considered "penalty nodes" and that are judged to reflect negatively on nodes linking to them. For example, by providing a rank for dangling web pages, the present system allows the concentration of crawling resources on those dangling web pages that have the highest rank in the uncrawled region. The present system operates locally to the dangling nodes, providing efficient determination of ranks for the dangling nodes.

Some dangling nodes are of extremely high quality. Consequently, a node that points to these dangling nodes is considered by the present system to have good hub characteristics as a result of the link relationship. In contrast, some dangling nodes may reflect negatively on nodes linking to them. For example, in the case of the web, URLs that return errors such as, for example, a 500-class error response or a 400-class error response. Exemplary 400 class error responses are a 404 HTTP return code or a 403 HTTP return code. A 404 HTTP return code indicates a broken link; the web page to which the link points does not exist. A 403 HTTP return code indicates that the user is forbidden from accessing the page to which the link points. Such Web pages that return these errors are examples of penalty nodes. Consequently, the present system decreases the rank of a node that comprises links to penalty nodes.

The present system calculates a rank for the dangling nodes as if all the dangling nodes were just one node, grouped together in a virtual node. The present system then calculates the rank of the non-dangling nodes together with the virtual node. The present system further modifies the jump probability to the virtual node by the number of outlinks to dangling nodes from a non-dangling node. Conventional graph ranking techniques utilize a virtual node in a different manner, as a mathematically formulation of random jumps in the random walk underlining the ranking paradigm.

In contrast to conventional graph ranking techniques, the present system converts links to the dangling nodes into links to the virtual node. In this manner, the present system removes the dangling nodes from the initial ranking calculation. The initial ranking calculation is then performed on the virtual node and the non-dangling nodes. The present system then mathematically computes the ranks of the dangling nodes from the ranks of the non-dangling nodes and the virtual node.

A penalty node may occur, in the case of the Web, because a link to a web page existed at the time that the link was created, but was subsequently removed from the web, causing a broken link. The web page comprising the broken link is no longer being maintained and is out of date. In addition, a penalty node may occur because the original link was created in error; the web page never existed. In this case, the present system considers the web page comprising the link as having been poorly authored; the links were never checked for validity. A link to a web page that returns a 403 HTTP return code indicates a link to a page that is either not meant for public access or that resides on a server that is poorly configured. In this case, the present system considers the web page comprising the link as having been poorly authored; the author did not verify that the linked page to be publicly accessible.

Other information networks may exhibit similar cases. For example, in a personal trust network, some of the nodes may have turned out to represent imposters. These nodes are then removed from the network. People who trusted the imposters may be considered to be less reliable than people who did not, as they failed to identify the imposters as such.

The present system considers nodes that reflect negatively on nodes linking to them as "penalty nodes". The concept of penalizing a node for linking to a penalty node has not previously been addressed by conventional graph ranking techniques. Conventional graph ranking techniques compute a rank based on nodes immediately "upstream" of a node rather than nodes immediately "downstream" of a node.

The present system explicitly discriminates against nodes on the basis of whether they point to penalty nodes. By incorporating more fine-grained information such as this into ranking, the present system can improve the quality of ranking on the graph.

The present system models a random walk through a graph in which scores are conferred to the nodes walked through by the graph ranking system. When the present system reaches a penalty node, the path to the penalty node is through a contributing node and a penalized node. The penalized node is the node that linked to a penalty node. The rank of a node is based on its final score. The contributing node contributed score to the penalized node that the present system wishes to return by means of any of the following processors, either singly or in combination: the push-back processor, the self-loop processor, the jump-weighting processor, and the rank redistribution processor.

The push-back processor returns a fraction of the score assigned to penalized nodes proportional to the fraction of outlinks to penalty nodes back to the contributing node or nodes. The pushed-back score is distributed among the contributing nodes in the same proportion that the contributing nodes conferred scores to the penalized node.

The self-loop processor confers scores to nodes by forming a self-loop on every node. For every node in the random walk, the next step is to either stay at the node (forming a self-loop), follow an outlink from the node, or jump to a virtual node. The self-loop processor specifies that the probability of staying at the node and receiving the score associated with staying at the web page is inversely proportional to the fraction of links out of the node that link to penalty nodes.

Whenever the random walk reaches the virtual node, a jump to a random node occurs. The jump-weighting processor modifies the probability of a node being the terminus of the random jump by attaching a jump weight to each node. The jump weight is inversely proportional to the number of penalty nodes to which the node links. A node with a high penalty fraction will have a lower possibility of receiving rank from a random jump.

The rank redistribution processor alternates forward and backward steps in the random walk when encountering a node that is not a penalty node. The backward step confers score to the node. If the node is a dangling node but not a penalty node, the rank redistribution processor propagates the score associated with the dangling node among all the web pages contributing scores to the dangling node in the same proportion the score was contributed. If the node is a penalty node, the rank redistribution processor jumps to the virtual node, preventing scores associated with the step from being assigned to the node that linked to the penalty node.

The present system may be embodied in a utility program such as a directed graph processing utility program. The present system provides means for the user to identify a directed graph for which the present system performs processing of dangling nodes. The present system further provides means for the user to specify a method by which the rank of nodes linking to penalty nodes is adjusted. Alternatively, the user may specify that ranks of nodes linking to penalty nodes not be adjusted. The user selects the input data, specifies whether ranks are adjusted for nodes linking to penalty nodes, selects a method by which ranks are adjusted for nodes linking to penalty nodes, and then invokes the graph processing utility program to rank the nodes in the directory or the index.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items.

DETAILED DESCRIPTION OF PREFERRED EMBODIMENTS

The following definitions and explanations provide background information pertaining to the technical field of the present invention, and are intended to facilitate the understanding of the present invention without limiting its scope:

Contributing Web Page: A web page that contributes rank to a penalty page through a link to the penalty page.

Dangling Web Page (Dangling web page): Web pages that have no outlinks or have outlinks that cannot be crawled either because the outlinks link to web pages inaccessible by a crawler or because the outlinks return an error to a crawler.

Inlink: Links coming into a web page or document such as an HTML document from another web page or document.

Internet: A collection of interconnected public and private computer networks that are linked together with routers by a set of standards protocols to form a global, distributed network.

Link: A pointer in a web page or in a document such as an HTML document that leads to another web page or to another place within the same document; also called a hyperlink.

Outlink: Links from a web page or document such as an HTML document to another web page or document.

Penalty Fraction: The fraction of outlinks on a web page that leads to penalty web pages as compared to the total number of outlinks on the web page.

Penalty Page: A web page that returns an error when a link to that web page is followed. A penalty page has no content.

Penalized web page: A web page comprising links to penalty pages.

Teleportation: a random jump from one web page to another that is not associated with actual links.

URL (Uniform Resource Locator): A unique address that fully specifies the location of a content object on the Internet. The general format of a URL is protocol://server-address/path/filename, where the server-address is referenced as the host rank.

Virtual Node: A notional additional node of the graph which collects random jumps from other nodes and redistributes them to those nodes.

World Wide Web (WWW, also Web): An Internet client—server hypertext distributed information retrieval system.

Figure 1:
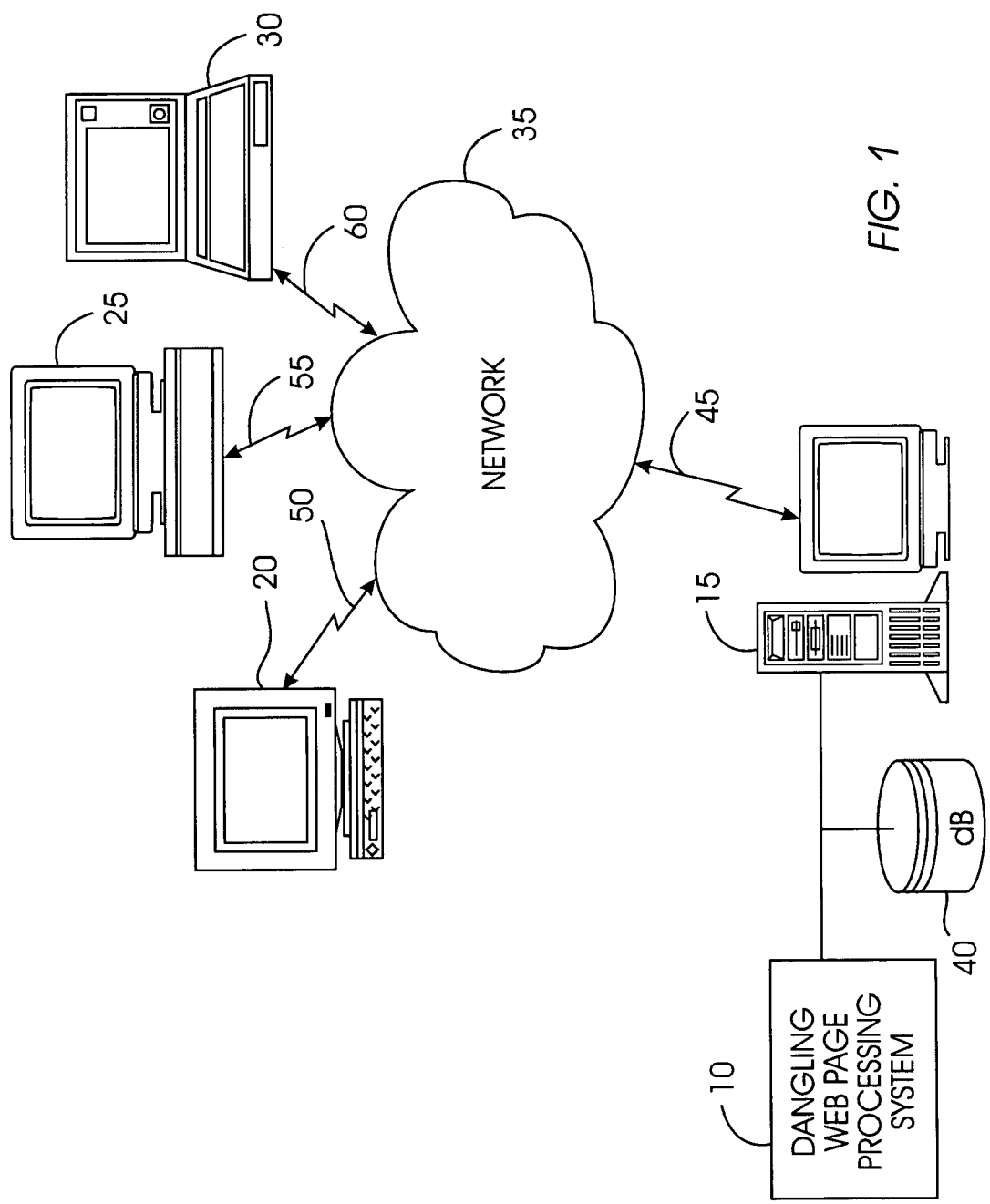
FIG. 1 is a schematic illustration of an exemplary operating environment in which a dangling web page processing system of the present invention can be used.

FIG. 1 portrays an exemplary overall environment in which a system and associated method (the "system 10") for ranking dangling web pages on the world wide web according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Users, such as remote Internet users, are represented by a variety of computers such as computers 20, 25, 30, and can access the host server 15 through a network 35. In one embodiment, system 10 ranks results obtained by a search engine operated on host server 15. The results are accessed by system 10 from database (dB) 40. Users access the results of the ranking when performing key word searches on the Internet. In another embodiment, users provide an index or other hierarchical structure to system 10; system 10 then ranks the index or other hierarchical structure for the user. Output from system 10 is stored on dB 40 or on a storage repository of the user.

Computers 20, 25, 30 each comprise software that allows the user to interface securely with the host server 15. The host server 15 is connected to network 35 via a communications link 45 such as a telephone, cable, or satellite link. Computers 20, 25, 30, can be connected to network 35 via communications links 50, 55, 60, respectively. While system 10 is described in terms of network 35, computers 20, 25, 30 may also access system 10 locally rather than remotely. Computers 20, 25, 30 may access system 10 either manually, or automatically through the use of an application.

Figure 2:
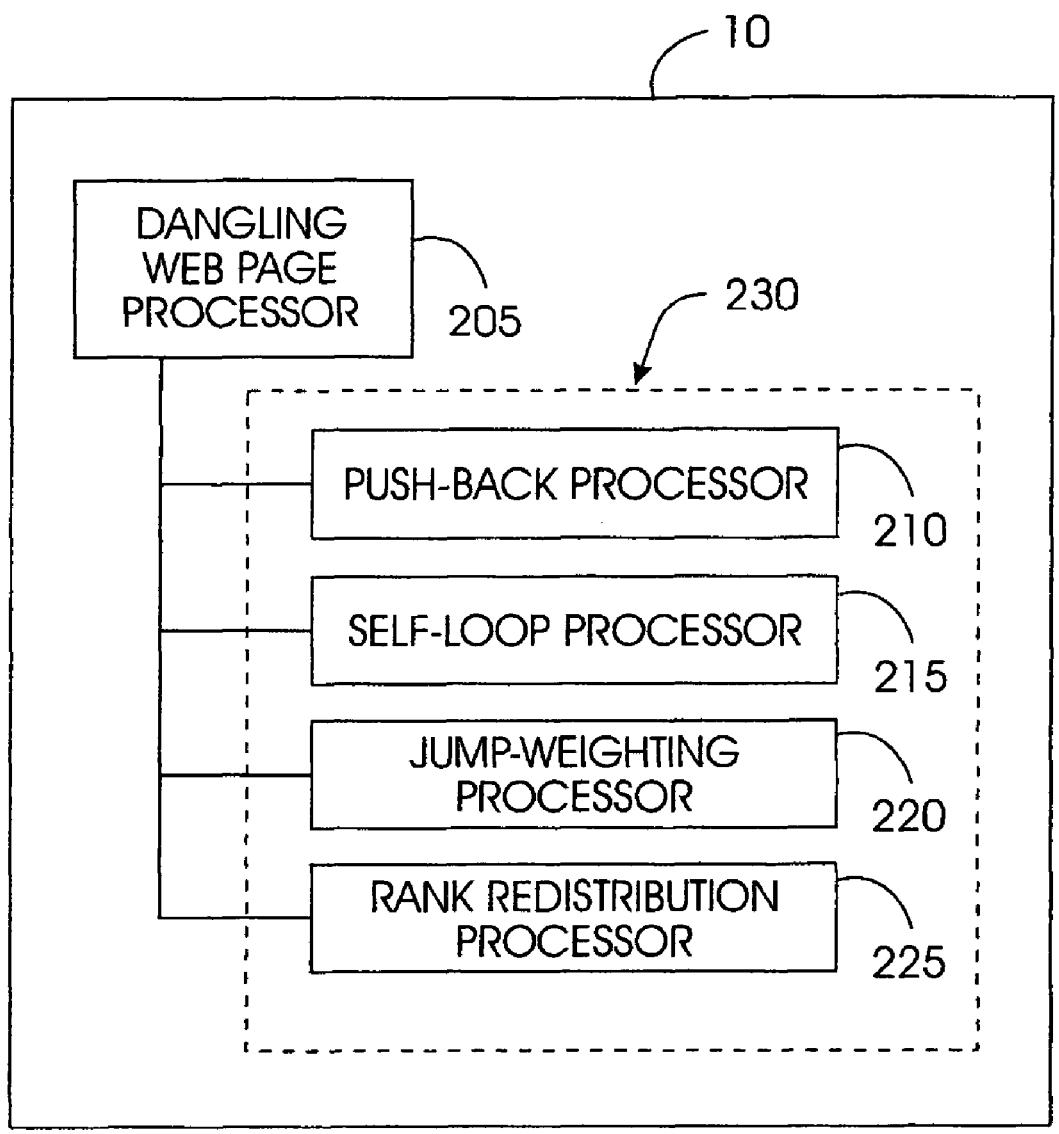
FIG. 2 is a block diagram of the high-level architecture of the dangling web page processing system of FIG. 1.

FIG. 2 illustrates a high-level hierarchy of system 10. System 10 comprises a dangling web page processor 205. System 10 further push-back processor 210, a self-loop processor 215, a jump-weighting processor 220, and a rank redistribution processor 225, collectively referenced herein as penalty page processors 230. The dangling web page processor 205 removes the dangling web pages from the ranking calculation by linking each of the dangling web pages to a virtual node. The dangling web page processor 205 then calculates a rank for a set of crawled pages and a virtual node. The dangling web page processor 205 adjusts the ranks of the dangling web pages based on the ranks of the crawled pages and the virtual node. System 10 uses any of the penalty page processors 230 to penalize the ranks of web pages that link to penalty pages. The excess ranking generated by penalizing web pages that link to penalty pages is then returned to contributing web pages, web pages that contributed rank to these penalized web pages.

Conventional ranking techniques model the Web (or other corpora) as a directed graph G=(V, E). The rank, or "importance", $x_i$ of each of the n nodes $i \in V$ is defined recursively in terms of the nodes that point to (link to) it:

$$x_i = \sum_{(j,i) \in E} a_{ij} x_j \qquad (1)$$

Written in matrix terms, equation (1) becomes x=Ax. For the system represented by equation (1) to have a useful solution, A is required to be (column) stochastic; i.e., $e^T A = e^T$, where $e^T$ is the vector of all ones. Consequently, x is the principal eigenvector corresponding to the principal eigenvalue unity. Reference is made to G. Golub, et al., "Matrix Computations," Johns Hopkins University Press, Baltimore, 3rd edition, 1996.

A conventional "ideal" assumption is that G is strongly connected; i.e., every node can be reached by following links from every other node. In this case it is assumed that the $a_{ij}$ can be given by $1/d_j$, where $d_j$ is the out-degree of node j. This ideal assumption assumes that a "surfer" follows the outlinks from a node with equal probability. However, in practice, the web is not strongly connected. Consequently, adjustments to the ideal case are required to compensate for non-ideal aspects of the web.

A common adjustment to the ideal assumption is the addition of links from nodes with no outlinks to some or all of the other nodes. A further adjustment is the use of "random jumps" not associated with actual links (also referenced herein as teleportation). These adjustments are typically represented by modifying equation (1) as follows:

$$x = [(1-\alpha)fe^T + \alpha A]x \qquad (2)$$

where α is the probability of following an actual outlink from a node, (1−α) is the probability of taking a "random jump" rather than following a link, and f is a stochastic vector (i.e., $e^T f=1$). The stochastic matrix in equation (2) is a convex combination of A and a rank one matrix.

Solving the equation (2) is equivalent to defining an additional "virtual" node n+1 and defining an augmented system. Reference is made to J. Tomlin, "A new paradigm for ranking web pages on the world wide web," In Proc. 12th World Wide Web Conference, web pages 350-355, Budapest, May 2003:

$$\begin{pmatrix} x \\ x_{n+1} \end{pmatrix} = \begin{pmatrix} \alpha A & f \\ (1-\alpha)e^T & 0 \end{pmatrix} \begin{pmatrix} x \\ x_{n+1} \end{pmatrix} \quad (3)$$

The solutions of this system are in one-to-one correspondence with those of the modified problem represented in equation (2).

Web page ranking techniques such as, for example, the PageRank algorithm, have many variations. For example, different choices for the teleportation parameter α can produce different convergence rates and different rankings. A typical value for α is α=0.85. This value appears to strike a balance between achieving rapid convergence and minimal perturbation to rankings. In addition, a random jump can be taken to one of an arbitrary set of nodes, as defined by f. Further variations comprise the choice of a uniform distribution among all nodes (i.e. f=e/n), among a set of trusted "seed sites", uniformly among the set of all "top-level" nodes of sites, or a personalized set of preferred nodes. Reference is made to L. Page, et al., "The PageRank citation ranking: Bringing order to the web," Technical report, Stanford Digital Library Technologies Project, 1998.

To calculate the rank of dangling nodes, the dangling node processor 205(?) partitions the nodes V of the graph (n=|V|) into two subsets, C and D. The subset C corresponds to a completely (strongly) connected subgraph (|C|=m). The remaining nodes in subset D have links from C but no outlinks. In addition, system 10 assumes a virtual $(n+1)^{th}$ node to and from which random jumps may be made (as in equation (3)). The node set of system 10 is denoted V'=V ∪ {n|1}. In addition, system 10 adds new edges (i, n+1) for i∈D and (n+1, j) for j∈C to define an expanded edge set E'.

The dangling web page processor 205 partitions the matrix and vector of equation (3) and computes the ranking of the nodes in V' via the principal eigenvector computation:

$$\begin{pmatrix} x \\ y \\ z \end{pmatrix} = \begin{pmatrix} \alpha C & 0 & e/m \\ \alpha D & 0 & 0 \\ (1-\alpha)e^T & e^T & 0 \end{pmatrix} \begin{pmatrix} x \\ y \\ z \end{pmatrix} \quad (4)$$

where, if $d_j$ is the out-degree of node j $$c_{ij} = \begin{cases} d_j^{-1} & \text{if } (i,j) \in E \text{ and } i, j \in C \\ 0 & \text{otherwise} \end{cases}$$

$$d_{ij} = \begin{cases} d_j^{-1} & \text{if } (i,j) \in E \text{ and } i \in C, j \in D \\ 0 & \text{otherwise} \end{cases}$$

and x, y, z are of the row dimension of C, D and 1; e is the vector of ones of conforming dimension. The individual equations for x, y, and z are:

$$x = \alpha C x + (z/m) e \quad (5)$$

$$y = \alpha D x \quad (6)$$

$$z = (1-\alpha)x + e^T y \quad (7)$$

Solving for z in terms of x alone yields:

$$z = \{(1-\alpha)e^T + \alpha e^T D\} x \quad (8)$$

System 10 exploits this structure to compute x (and z) from a reduced eigen-system:

$$\begin{pmatrix} \hat{x} \\ \hat{z} \end{pmatrix} = \begin{pmatrix} \alpha C & e/m \\ (1-\alpha)e^T + \alpha e^T D & 0 \end{pmatrix} \begin{pmatrix} \hat{x} \\ \hat{z} \end{pmatrix} \quad (9)$$

since the reduced matrix is column stochastic and $$\hat{x} = \alpha C \hat{x} + (\hat{z}/m) e \quad (10)$$

$$\hat{z} = \{(1-\alpha)e^T + \alpha e^T D\} \hat{x} \quad (11)$$

System 10 solves the eigen system problem of equation (9) by (for example power iteration) to obtain x=x̂ and then computes the ranks of the nodes in D in the single step:

$$\hat{y} = \alpha D \hat{x} \quad (12)$$

Consequently, system 10 provides significant processing savings unless |D| is small.

Figure 3:
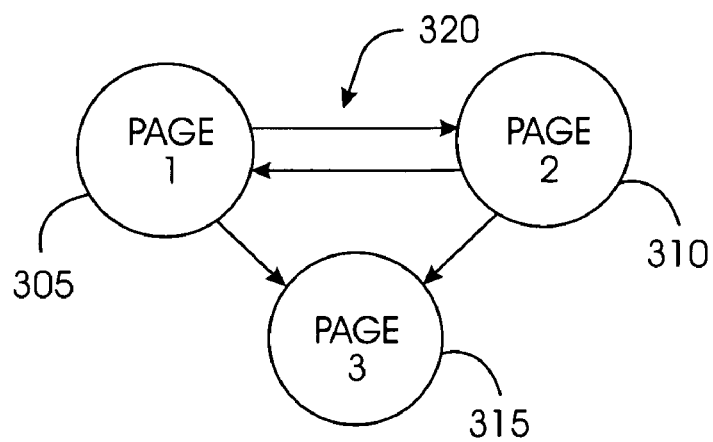
FIG. 3 is a diagram illustrating a set of web pages and links between web pages illustrating an effect that dangling web pages can have on non-dangling web pages with and without teleportation as determined by the dangling web page processing system of FIGS. 1 and 2.

Dangling nodes can have significant effects on the ranking of non-dangling nodes as illustrated by the diagram of FIG. 3 comprising web page 1, 305, web page 2, 310, web page 3, 315, and links 320. Web page 3, 315, is a dangling web page because it has no outlinks. In this example, it is important whether teleportation to dangling web pages is allowed. If uniform jumps from the dangling web page, web page 3, 320, to all nodes (including the dangling web page) are allowed, then the transition matrix is:

$$\begin{bmatrix} 0 & \frac{1}{2} & \frac{1}{3} \\ \frac{1}{2} & 0 & \frac{1}{3} \\ \frac{1}{2} & \frac{1}{2} & \frac{1}{3} \end{bmatrix}$$

Consequently, there is no need for teleportation because the graph is now strongly connected. In this example, web page 3, 315, has a higher rank than web pages 1, 305, and web page 2, 310, since it has 2 inlinks and they have only one each.

If teleportation to dangling web pages is avoided, a different result is produced by analysis of FIG. 3 by system 10. Using the notation previously presented, C={1, 2} and D={3}, such that web page 1, 305, and web page 2, 310, are in C and web page 3, 315, is in D. The reduced transition matrix of equation (9) (with α=0.85) is:

$$\begin{bmatrix} 0 & 0.425 & \frac{1}{2} \\ 0.425 & 0 & \frac{1}{2} \\ 0.575 & 0.575 & 0 \end{bmatrix}$$

The corresponding normalized web page ranks are:
($x_1$, $x_2$, z)=(0.317, 0.317, 0.365).

Consequently, the virtual web page, z, receives a higher rank than web page 1, 305 or web page 2, 310, again because it has two inlinks from the random jumps from web page 1, 305, and web page 2, 310. Web page 1, 305, and web page 2, 310, each have only one inlink among links 320.

The dangling node processor 205 now determines the rank of the dangling node (web page 3, 315) via equation (12). Consequently, web page 3, 315, has a rank of 0.27, lower than web page 1, 305, or web page 2, 310. Further, the rank of web page 3, 315, is less than the rank of the virtual node, z, because the virtual node, z, also receives random (teleportation) jumps from web page 1, 305, and web page 2, 310.

Figure 4:
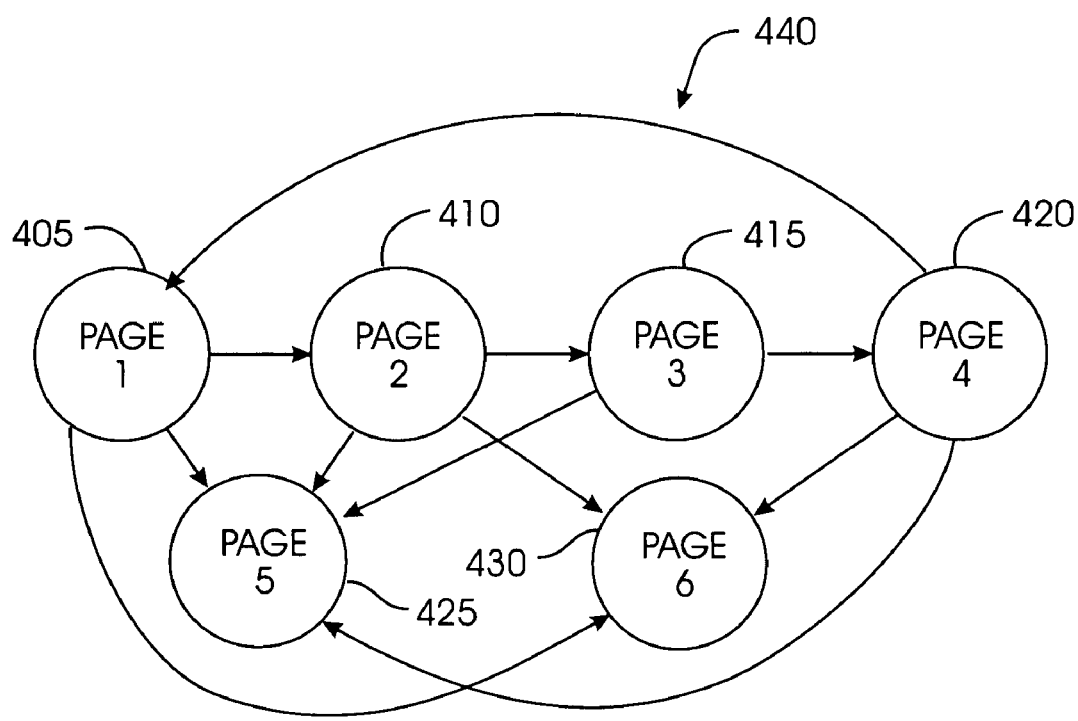
FIG. 4 is a diagram illustrating a set of web pages comprising a dangling web page and links between web pages with no teleportation that may be analyzed by the dangling web page processing system of FIGS. 1 and 2.

The diagram of FIG. 4 illustrates another example, showing that dangling nodes can have a higher rank than non-dangling nodes, even when teleportation to dangling nodes is forbidden. The diagram of FIG. 4 comprises web page 1, 405, web page 2, 410, web page 3, 415, web page 4, 420, web page 5, 425, and web page 6, 430, collectively referenced as web pages 435, and links 440. Web page 5, 425, and web page 6, 430, are dangling web pages.

The dangling node processor 205 solves the reduced system (9) and generates the y values to obtain the normalized ranks (including that of the virtual node, z,) of web pages 435 such that:
(x, y, z)=(rank 1, rank 2, rank 3, rank 4, rank 5, rank 6, rank Z)
(x, y, z)=(0.1229, 0.1119, 0.1087, 0.1079, 0.1432, 0.09732, 0.3082)

Rank 1 is the rank of web page 1, 405. Rank 2 is the rank of web page 2, 410. Rank 3 is the rank of web page 3, 415. Rank 4 is the rank of web page 4, 420. Rank 5 is the rank of web page 5, 425. Rank 6 is the rank of web page 6, 430. Rank Z is the rank of the virtual node, z. The virtual node, z, has the highest rank. However, the web page 5, 425, which is a dangling web page has a higher rank than any of the connected web pages; i.e., web page 1, 405, web page 2, 410, web page 3, 415, and web page 4, 420.

Figure 5:
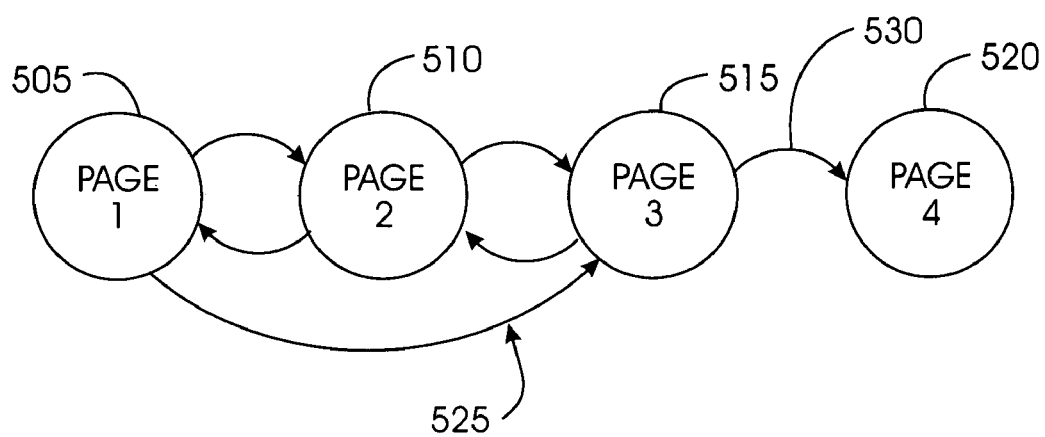
FIG. 5 is a diagram further illustrating a set of web pages comprising a dangling web page and links between web pages that may be analyzed by the dangling web page processing system of FIGS. 1 and 2.

FIG. 5 illustrates another example in which penalty web pages are significant. FIG. 5 comprises web page 1, 505, web page 2, 510, web page 3, 515, web page 4, 520, and links 525. Web page 4, 520 is a dangling web page with a link 530 from web page 3, 515. The dangling web page processor 205 computes the ranks with α=0.85, such that:
S=[rank 1, rank 2, rank 3, rank Z]
S=[0.1987, 0.2831, 0.2831, 0.2351].

Rank 1 is the rank of web page 1, 505. Rank 2 is the rank of web page 2, 510. Rank 3 is the rank of web page 3, 515. Rank Z is the rank of the virtual node, z.

If web page 3, 515, has not one but four links to dangling nodes, the ranks are:
S=[0.196, 0.2293, 0.2792, 0.2955]

Because of the presence of the additional dangling web pages, the rank of the virtual node, z, has increased. However, the rank of web page 2, 510, has significantly decreased, from 0.2831 in the first example to 0.2293 in the second example due to the presence of dangling nodes on web page 3, 515. Consequently, dangling web pages can have a significant effect on the ranks of nearby web pages.

In the event that the dangling nodes represent penalty pages, system 10 applies a reduction in rank to the web page that comprises the dangling web pages rather than the neighbors of the web page comprising dangling web pages. Otherwise, web pages can accumulate rank by accumulating a quantity of links to dangling web pages to the detriment of web pages that have no links to dangling web pages. The web page that comprises a link to a penalty page is referenced as a penalized web page. The one or more web pages that contribute rank to the penalty page are referenced as contributing web pages. Consequently, system 10 modifies the calculation of the ranks to transfer rank from the penalized web page to the contributing web pages. System 10 utilizes any of the penalty page processors 230 to implement this transfer of rank.

The push-back processor 210 is independent of the dangling node processor 203. Its function is to reduce by a fraction the rank of a penalized node, creating an excess rank at the penalized node. The push-back processor 210 then returns the excess rank from the penalized node to one or more contributing nodes that pushed rank to the penalized node in the previous iteration. Excess rank is returned to the contributing nodes in the same proportion that the contributing nodes conferred rank to the penalized node. Consequently, the push-back processor 210 limits the "inflow" of rank to penalized nodes To mathematically describe the push-back processor 210, let i be a node that has a link to a penalty page i. The rank of $x_i$ for web page i can be calculated from equation (1):

$$x_i^{(k+1)} = \sum_{(j,i) \in E} a_{ij} x_j^{(k)} \qquad (13)$$

The push-back processor 210 wishes to return a portion (say β, where 0<$β_i$<1) of that rank $x_i$ to the contributing nodes that point to the node i (i.e., the j such that j, i)∈E). The push-back processor 210 returns the portion of the rank $x_i$ to the contributing web nodes as follows:

$$x^{(k+1)} = BAx^{(k)}$$

The matrix B, like A, is a column stochastic matrix; i.e., $e^T A = e^T$, where $e^T$ is the vector of all ones. This clearly preserves the column stochastic property, since $e^T$ (BA)= $e^T A = e^T$.

The push-back processor 210 returns the excess rank from the penalized node to the contributing nodes in the same proportion as it was bestowed in equation (13). The penalized node i retains a proportion (1−$β_i$) of its undiluted rank. The excess rank is distributed in proportion to the contributing nodes (i.e., the j such that (j, i)∈E). The push-back processor 210 normalizes these proportions so that the total is one.

Consider the case of a single penalized node. Without loss of generality, this single penalized node may be assumed to be the first node examined by system 210. In matrix terms, the "push-back" of ranking to a contributing node corresponds to a B of the following form:

$$B = \begin{pmatrix} (1-\beta_1)/\sigma & 0 \\ \beta_1 \bar{a}_1/\sigma & I \end{pmatrix} \quad (14)$$

where $\bar{a}_1^T$ is the first row of A (except for $a_{11}$) and $$\sigma = (1-\beta_1) + \beta_1 e^T \bar{a}_1$$

is a normalizing factor, such that B is column stochastic.

In the event that several nodes are penalized, the push-back processor 210 extends this procedure to construct a B such that each penalized node "gives back" the fraction $(1-\beta_i)$ of its initial rank. In practice, the push-back processor 210 introduces an extra step at each iteration of the ranking iteration—the (sparse) post-multiplication of the rank vector by B.

As an example, the push-back processor 210 applies to web pages with links that point to 404 web pages (or other bogus nodes). Let $g_i$ be the number of "good" links out of penalty p i and let $b_i$ be the number of bad (penalty) links out of node i. The push-back processor penalizes penalty page i by setting $$\beta_i = \frac{b_i}{g_i + b_i}.$$

In a further example, FIG. 5 is modified such that web page 3, 515, comprises eight links to dangling web pages of which four dangling web pages are bad (404s) and four dangling web pages are good. The push-back processor 210 obtains a set of ranks for web page 1, 505, web page 2, 510, web page 3, 515, and the virtual node, z, as follows:

S=[rank 1, rank 2, rank 3, rank Z]

S=[0.2923, 0.3122, 0.1666, 0.229].

Rank 1 is the rank of web page 1, 505. Rank 2 is the rank of web page 2, 510. Rank 3 is the rank of web page 3, 515. Rank Z is the rank of the virtual node, z. Due to the presence of the bad dangling web pages, web page 3, 515, has a significantly reduced rank compared to web page 1, 505, and web page 2, 510.

An alternative "self-loop" method" for processing penalty nodes will now be described. Ordinarily at each step of the PageRank algorithm, system 10 follows an outlink with probability α, or jumps to a random node with probability 1−α. The self-loop processor 215 augments each node with a self-loop link to itself and with some probability $\gamma_i$ follows this self-loop link. The self-loop processor 215 assumes that all self-loops have been removed from the link graph prior to augmentation. The probability $\gamma_i$ is smaller if the node has a large number of outlinks to penalty nodes. Consequently, the self-loop processor 215 allows a node that has no bad outlinks to retain some of its rank by following a link to itself. In contrast, the self-loop processor 215 does not allow a node with only bad links to retain any of its rank.

In one embodiment, the self-loop processor 215 chooses a probability γ for $\gamma_i$ and uses the following:

$$\gamma = \frac{g_i}{b_i + g_i}$$

where again $b_i$ is the number of outlinks from node i to penalty nodes, and $g_i$ is the number of outlinks to non-penalty nodes. To create a stochastic matrix, the self-loop processor 215 adjusts the teleportation probability from 1−α to $$1 - \alpha - \frac{\gamma b_i}{b_i + g_i}.$$

In one embodiment, the self-loop processor 215 simply adds self-loops to a node for every good outlink and selects a random outlink from the node (including the added self-loops) with equal probability at each iteration.

In another embodiment, the self-loop processor 215 chooses a parameter $\gamma_i$ for each node. System 10 follows the self-loop with probability $\gamma_i$ and follows the standard ranking process with probability 1−$\gamma_i$. This embodiment results in transition probabilities of $\gamma_i$ for the self-loop, probability $(1-\gamma_i)(1-\alpha)$ for the teleportation step, and probability $\alpha(1-\gamma_i)/g$ of following a non-penalty outlink from a node. While this embodiment results in no rank for penalty pages, this embodiment can be modified in an obvious way to compute such ranks.

The dangling node processor 205 treats bad links (such as 404s) as dangling nodes in the web graph and collapses them into the virtual node, z, along with the legitimate dangling nodes (equation (4)). The dangling node processor 205 then redistributes the rank of the virtual node, z, evenly (or to a chosen seed set) through "random jumps" to web pages. The jump-weighting processor 220, which is an alternative to the "push-back" and "self-loop" methods, biases the redistribution of rank such that penalized nodes receive less of this redistributed rank. The jump-weighting processor 220 provides a jump probability to each nodes based on the number of penalty pages a web page links to.

Using the above notation for good and bad web pages, a jump-weighting processor 220 weights a link from the virtual node, z, to an unpenalized node in C (or the seed set) by ρ and to a penalized node by $\rho g_i/(g_i+b_i)$, where ρ is chosen so that the sum of all the edge weights representing these links is unity.

Conventional ranking techniques rank nodes (such as web pages) by performing a "random walk" among nodes following links from one node to another or jumping to a random node, always in a forward motion. Another conventional technique alternates forward and backward steps in the "random walk". Reference is made to S, Chakrabarti, et al., "Automatic resource compilation by analyzing hyperlink structure and associated text," In *Proc. 7th World Wide Web Conference*, web pages 65-74, 1997. The backward step more evenly distributes rank among the nodes. The method in the reference is conventionally used on a subgraph associated with a specific query In contrast, the rank redistribution processor 225 is an alternative to the "push-back", "self-loop" and "jump-weighting" techniques, does not depend on a query, and ranks all nodes in the graph.

The rank redistribution processor 225 is most easily described by a random walk that comprises two steps, namely a forward step using any conventional node ranking approach. For all non-dangling nodes, the rank redistribution processor then takes a backward step that comprises a self-loop. In the case of linking to a penalized node, the rank redistribution processor 225 does not take a backward step but instead forwards all of the rank of the penalized node to the virtual node, z. In the case of a non-penalty node, the backward step performed by the rank redistribution processor 225 divides the current rank of the non-penalty node by the number of inlinks. The rank redistribution processor 225 then propagates the rank of the non-penalty node equally among all of the backward links.

The rank redistribution processor 225 assumes that all web pages have an inward link as is true of web pages discovered by crawling. The rank redistribution processor 225 further assumes that the seed web pages have known inward links that the rank redistribution processor 225 processes. Without loss of generality, the rank redistribution processor 225 treats any node with no inlinks as a penalty node. When the rank redistribution processor 225 encounters a penalty node, the rank redistribution processor 225 takes a step to a randomly selected seed node or the virtual node, z, rather than traversing an inlink in the reverse direction. Consequently, the rank redistribution processor 225 "returns" the rank of web pages that point to non-penalty pages while redistributing the rank that is given to penalty pages.

The rank redistribution processor 225 utilizes a matrix B that encodes a backwards step. If P denotes the matrix representing a conventional node ranking process, then a matrix describing the rank redistribution processor 225 is simply BP, where B is the matrix that encodes the backwards step. More specifically, the rank redistribution processor 225 orders nodes such that the penalty pages are at the end. For a non-penalty node j, let $\delta(j)$ denote the indegree of a node j. Then let $$b_{ij} = \frac{1}{\delta(j)}$$

be the probability of going from j to i. In this case, the rank redistribution processor 225 obtains a matrix, B, as follows:

$$B = \left[ b_{ij} \,\middle|\, \frac{1}{m} \right]$$

Matrix B describes the backwards step performed by the rank redistribution processor 225. The number "1" in matrix B represents a matrix of ones. In one embodiment, this matrix of ones is replaced with a personalized distribution that favors some web pages over others. In another embodiment, the rank redistribution processor 225 excludes the penalty pages from the redistribution of weight. Consequently, p penalty nodes would produce a matrix such as:

$$B = \begin{bmatrix} B_{11} & \frac{1}{m-p} \\ B_{12} & 0 \end{bmatrix}.$$

The matrix BP is stochastic because it is the product of two stochastic matrices. This Markov chain produces a rank that is a unique stationary probability distribution on the web pages. The probability mass of penalty nodes is generally less using the rank redistribution processor than the probability mass of the same penalty node using conventional ranking techniques. Further, the rank redistribution processor 225 can be cast in a unified framework.

Considering the size of the web and other corpora, the feasibility of efficient implementations for any ranking processor is essential. The push-back processor 210, the self-loop processor 215, and the jump-weighting processor 220 require minimal computational overhead. The push-back processor 210, the self-loop processor 215, and the jump-weighting processor 220 are local in nature. Apart from the requirement to keep the matrix of equation (4) normalized, the changes to an entry in the $i^{th}$ row of the matrix of equation (4) are only dependent on the number of penalty outlinks, $b_i$, and "good" outlinks, $g_i$, from the $i^{th}$ node. The local nature of the push-back processor 210, the self-loop processor 215, and the jump-weighting processor 220 allows either the modified matrix to be pre-computed in linear time (given the vectors b and g), or the required modifications to be executed on the fly along with iterated ranking computations.

The forward/backward approach of the rank redistribution processor 225 requires an eigen-system that comprises the dangling web pages. Consequently, the rank redistribution processor 225 is larger than that required for a "forward-only" process based on conventional page ranking techniques.

Figure 6:
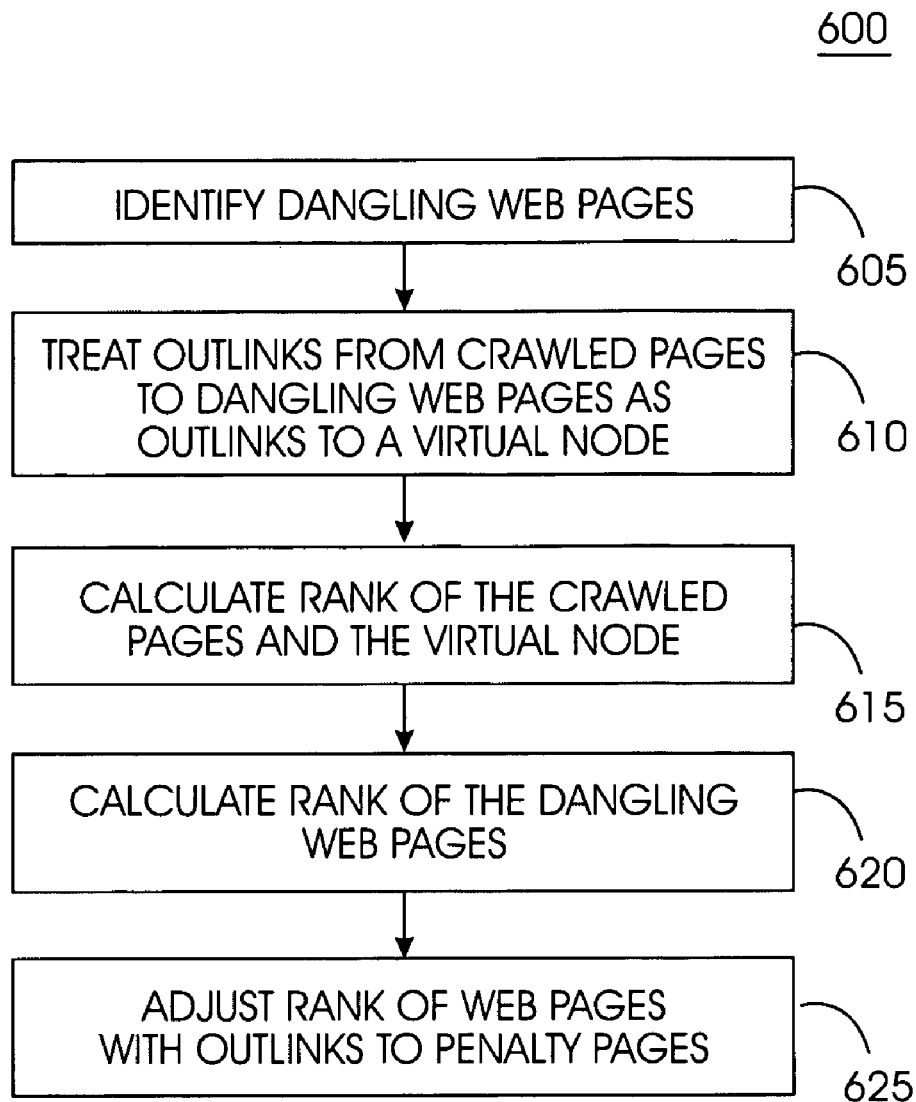
FIG. 6 is a process flow chart illustrating a method of operation of the dangling web page processor of the dangling web page processing system of FIGS. 1 and 2.

FIG. 6 illustrates a method 600 of the system 10. The dangling node processor 205 identifies dangling nodes (step 605) from the graph structure gathered by the crawler. The dangling node processor 205 then treats outlinks from crawled pages to dangling nodes as outlinks to a virtual node, z (step 610). The dangling node processor 205 calculates a rank for the crawled pages and the virtual node, z, (step 615) using any method of calculating ranks such as, for example, PageRank. The dangling node processor 205 further calculates a rank for the dangling nodes (step 620) as if the dangling web pages had been in the original page ranking calculation. In one embodiment, the rank calculated by the dangling node processor 205 is a stationary probability.

The ranks of the dangling web pages are calculated by the dangling web page processor 205 in one step. The ranking technique used for the non-dangling nodes (such as PageRank) utilizes any of the penalty page processors 230 to adjust the rank of web pages with outlinks to penalty pages (step 625).

Figure 7:
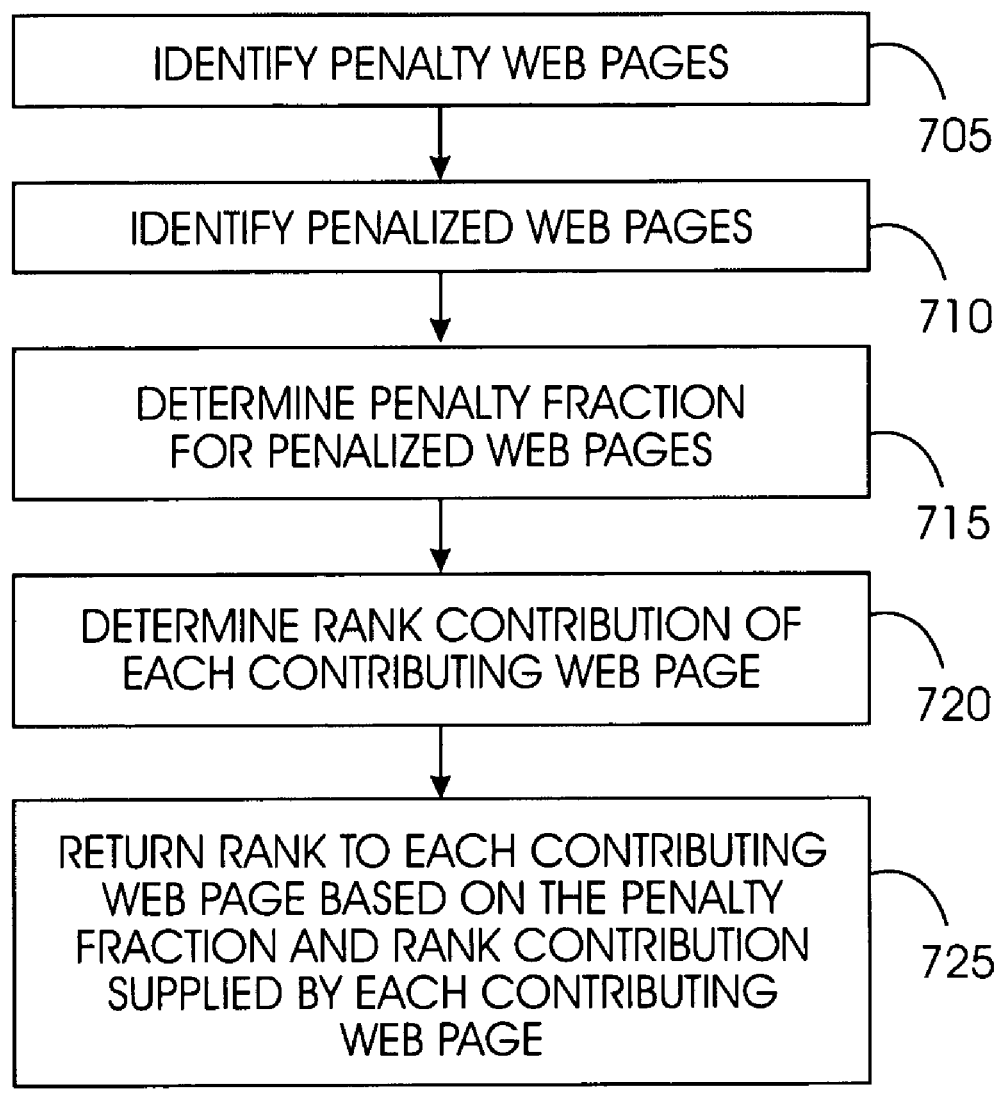
FIG. 7 is a process flow chart illustrating a method of operation of the push-back processor of the dangling web page processing system of FIGS. 1 and 2.

FIG. 7 illustrates a method 700 of the push-back processor 210. The push-back processor 210 identifies penalty nodes (step 705) and identifies penalized nodes (step 710). The push-back processor 210 determines the penalty fraction (step 715); the penalty fraction is the fraction of outlinks from the penalized node that link to penalty nodes. For example, a penalized node comprises four outlinks, three of which are links to penalty nodes. The penalized node then has a penalty fraction of ¾.

The push-back processor 210 determines the rank contribution made to the penalized node by each contributing node (step 720). The push-back processor 210 then returns rank to each contributing node that is based on the penalty fraction and the rank contribution supplied by the contributing node (step 725).

Figure 8:
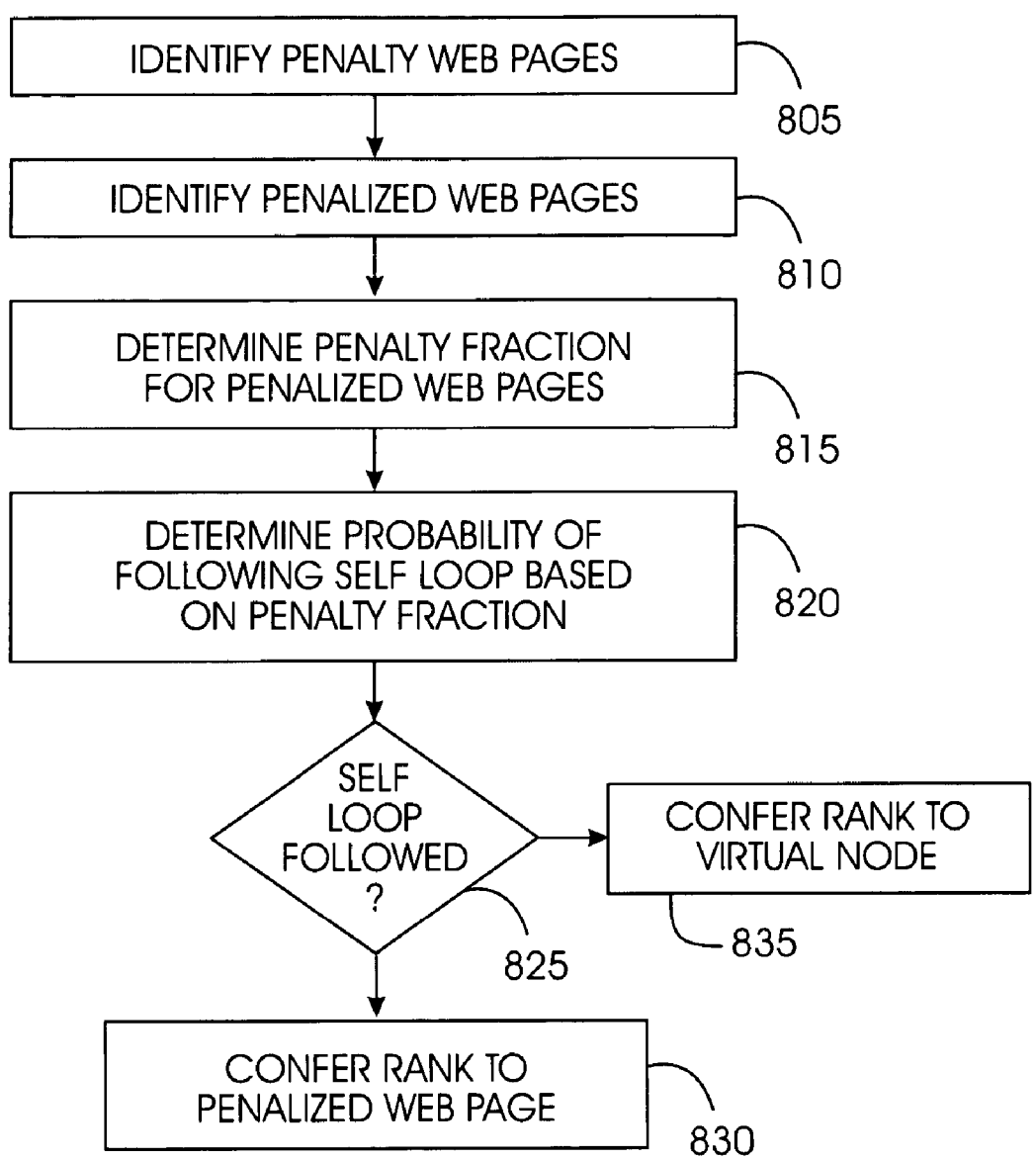
FIG. 8 is a process flow chart illustrating a method of operation of the self-loop processor of the dangling web page processing system of FIGS. 1 and 2.

FIG. 8 illustrates a method 800 of the self-loop processor 215. The self-loop processor 215 identifies penalty nodes (step 805) and identifies penalized nodes (step 810). The self-loop processor 215 determines the penalty fraction for penalized web pages (step 815). From the penalty fraction, the self-loop processor 215 determines a probability of following a self-loop (step 820). A high penalty fraction indicates that a high percentage of outlinks on the penalized node link to penalty nodes. The higher the penalty fraction for a penalized node, the lower the probability that a self-loop is followed. The self-loop processor 215 determines whether the self-loop is followed for a penalty node at decision step 825. If the self-loop is followed, the self-loop processor 215 confers rank to the penalized node (step 830). If the self-loop is not followed, the self-loop processor 215 confers rank to the virtual node, z.

Figure 9:
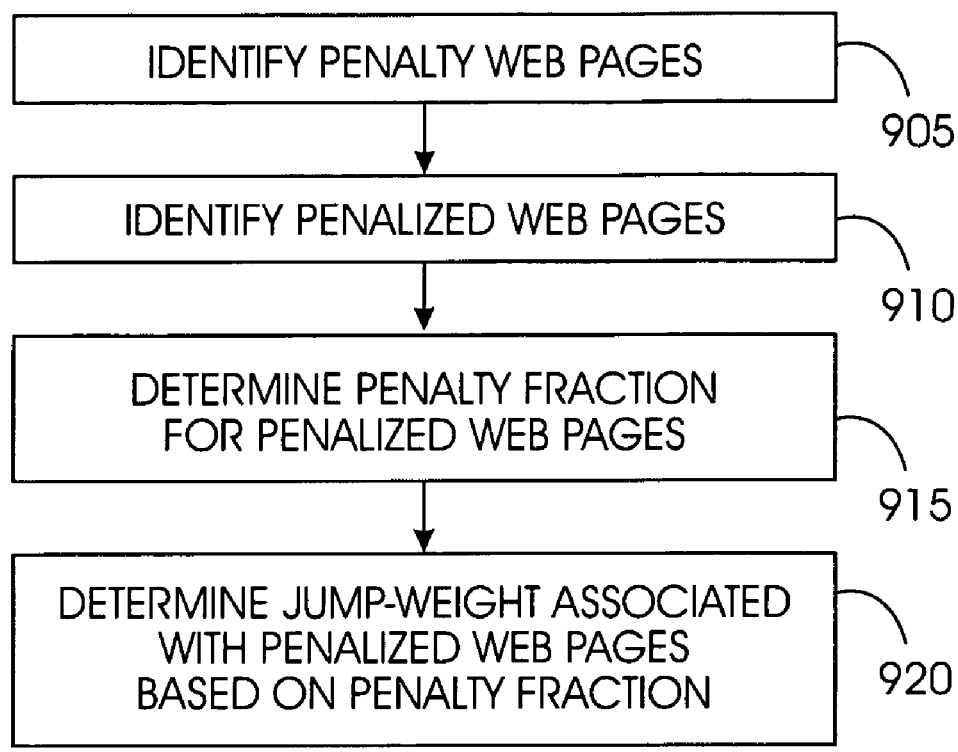
FIG. 9 is a process flow chart illustrating a method of operation of the jump-weighting processor of the dangling web page processing system of FIGS. 1 and 2.

FIG. 9 illustrates a method 900 of the jump-weighting processor 220. The jump-weighting processor 220 identifies penalty nodes (step 905) and identifies penalized nodes (step 910). The jump-weighting processor 220 determines the penalty fraction for penalized nodes (step 915). From the penalty fraction, the jump-weighting processor 220 determines a "jump weight" associated with penalized nodes based on the penalty fraction (step 920). The "jump weight" corresponds to a probability of randomly jumping to the penalized node from the virtual node, z. A high penalty fraction translates to a lower "jump weight" and a lower probability that rank is conferred to the penalized node from the virtual node, z, during a redistribution of rank from the virtual node, z.

Figure 10:
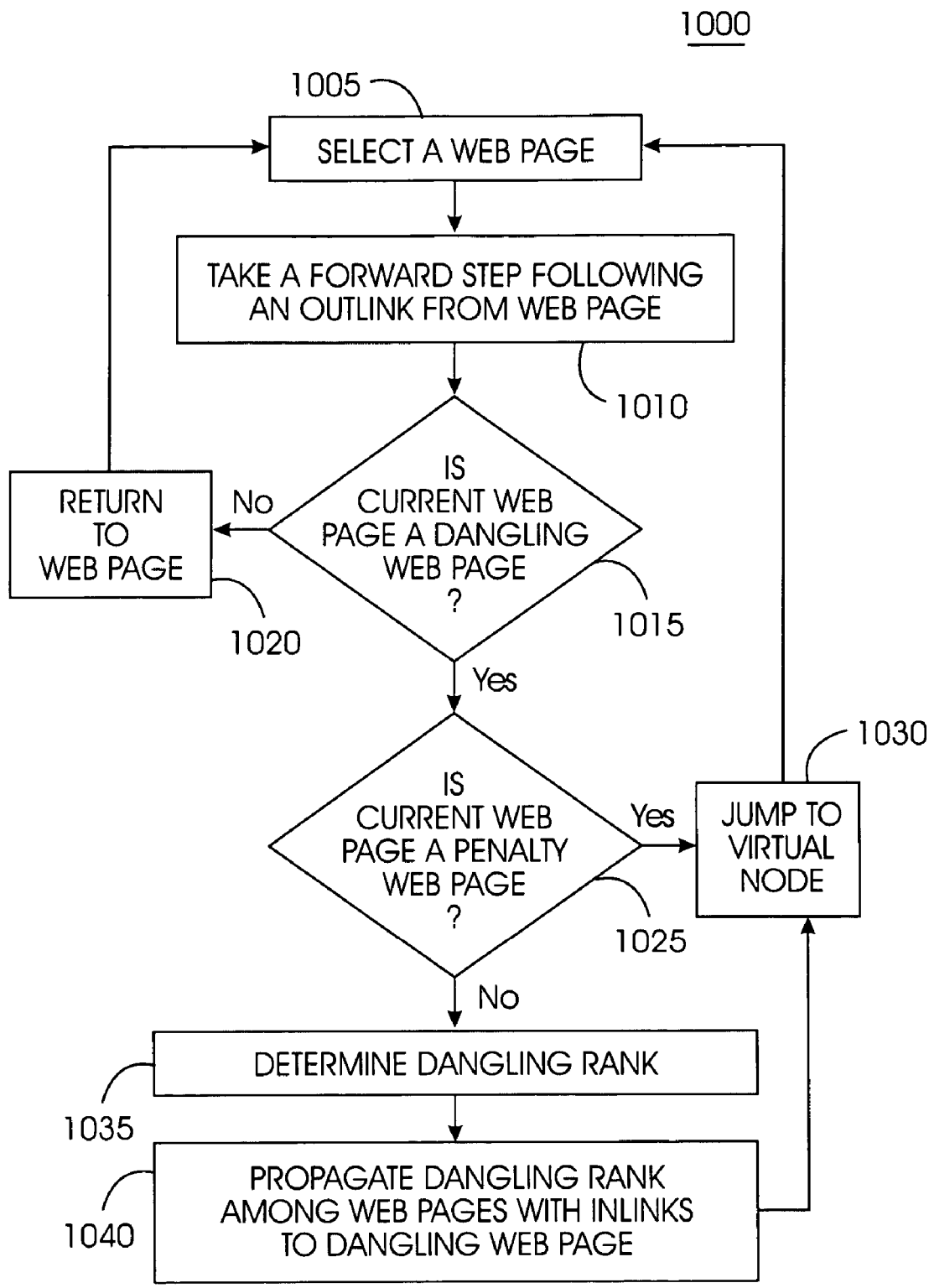
FIG. 10 is a process flow chart illustrating a method of operation of the rank redistribution processor of the dangling web page processing system of FIGS. 1 and 2.

FIG. 10 illustrates a method 1000 of the rank redistribution processor 225. A node is selected (step 1005) using any of a variety of page ranking techniques. An outlink is selected on the selected node and followed (step 1010). The rank redistribution processor 225 determines whether the current node is a dangling node (decision step 1015). If the current node is not a dangling node, the rank redistribution processor 225 returns to the selected node (step 1020).

If the current node is a dangling node (decision step 1015), the rank redistribution processor 225 determines whether the current node is a penalty node (decision step 1025). If the current node is a penalty node, the rank redistribution processor 225 jumps to the virtual node, z, (step 1030). From the virtual node, z, the node ranking technique selects a node (step 1005).

If the current node is not a penalty node (decision step 1025), the rank redistribution processor 225 determines a "dangling" rank (step 1035). The dangling rank is determined by dividing the rank of the node by the number of inlinks to the node. The rank redistribution processor 225 then propagates the dangling rank among each of a set of nodes with inlinks to this node (step 1040). For example, a node may have two inlinks. The rank redistribution processor 225 determines the dangling rank by dividing the rank of the node by two. The rank redistribution processor 225 then adds the dangling rank to the rank of each of the two nodes that have inlinks to the node. The rank redistribution processor 225 jumps to the virtual node, z, (step 1030). In one embodiment, the rank redistribution processor 225 may jump to a predetermined seed set. In another embodiment, the rank redistribution processor 225 may jump to a randomly selected node at step 1030.

It is to be understood that the specific embodiments of the invention that have been described are merely illustrative of certain applications of the principle of the present invention. Numerous modifications may be made to the system and method for ranking dangling nodes on an information network described herein without departing from the spirit and scope of the present invention. Moreover, while the present invention is described for illustration purpose mainly in relation to the WWW, it should be clear that the invention is applicable as well to, for example, intranets and subsets of the WWW in addition to data derived from any source stored in any format that is accessible by the present invention. Furthermore, although the present invention is described in terms of the PageRank algorithm, it should be clear that the present invention is applicable as well to, for example, other search applications and ranking techniques without departing from the scope of the present invention.

What is claimed is:

1. A processor-implemented method of ranking a plurality of nodes on a network, including dangling nodes, comprising:
   identifying at least one of the dangling nodes from among a plurality of crawled nodes;
   identifying an outlink from at least one of the crawled nodes to at least one of the dangling nodes;
   considering outlinks from the crawled nodes to the dangling nodes as virtual outlinks to a virtual node;
   calculating a first rank for the crawled nodes and a second rank for the virtual node;
   calculating a third rank for the dangling nodes from the first rank and the second rank; and
   outputting any one or more of the first rank, the second rank, and the third rank.

2. The method of claim 1, wherein the outlinks comprise links that allow navigation on the world wide web from a first page to a second page.

3. The method of claim 1, wherein calculating the first rank for the crawled nodes and the second rank for the virtual node comprises using a reduced eigen-system.

4. The method of claim 1, further comprising identifying as penalized nodes that have outlinks to penalty nodes.

5. The method of claim 4, wherein the penalized nodes have associated normal ranks; and
   further comprising reducing the normal ranks associated with the penalized nodes.

6. The method of claim 5, wherein reducing the normal ranks associated with the penalized nodes comprises using a push-back process.

7. The method of claim 6, wherein adjusting the first rank of at least some of the crawled pages comprises:
   identifying the penalty nodes;
   identifying the penalized nodes;
   determining a penalty fraction for the penalized nodes;
   determining a rank contribution provided by the contributing node to the penalized node;
   returning a portion of the rank contribution to the contributing page; and
   wherein the portion of the rank contribution is determined from the penalty fraction and the rank contribution.

8. The method of claim 5, wherein reducing the normal ranks associated with the penalized nodes comprises using a self-loop process.

9. The method of claim 8, wherein adjusting the first rank of at least some of the crawled pages comprises:
   identifying the penalty nodes;
   identifying the penalized nodes;
   determining the penalty fraction for the penalized nodes;
   determining a probability of following a self-loop in a random walk among the crawled nodes in the network, where the probability is determined from the penalty fraction;
   conferring rank from the penalty node to the virtual node if the self-loop is not followed; and
   conferring rank from the penalty node to the penalized node if the self-loop is followed.

10. The method of claim 5, wherein reducing the normal ranks associated with the penalized nodes comprises using a jump-weighting process.

11. The method of claim 10, wherein adjusting the first rank of at least some of the crawled pages comprises:
    identifying the penalty nodes;
    identifying the penalized nodes;
    determining the penalty fraction for the penalized nodes;
    determining from the penalty fraction a jump-weight associated with the penalized node that determines a jump probability that the penalized node will be a target of a random jump, the target of the random jump receiving a portion of the first rank from one of the crawled nodes from which the random jump originated.

12. The method of claim 5, wherein reducing the normal ranks associated with the penalized nodes comprises using a rank redistribution process.

13. The method of claim 12, wherein adjusting the first rank of at least some of the crawled nodes comprises:
following an outlink selected at one of the crawled nodes in a forward step to a current node;
returning to the selected one of the crawled nodes if the current node is a dangling node;
jumping to the virtual node if the current node is a penalty node;
determining a "dangling rank" for the current page;
propagating the dangling rank among at least some of the crawled pages that comprise links to the current page, wherein the dangling rank is determined from a count of the links to the current page and a rank of the current page.

14. A processor-implemented system installed on a host server for ranking a plurality of nodes on a network, including dangling nodes, comprising:
a dangling web page processor for identifying at least one of the dangling nodes from among a plurality of crawled nodes;
the dangling web page processor further identifying an outlink from at least one of the crawled nodes to at least one of the dangling nodes;
the dangling web page processor further considering outlinks from the crawled nodes to the dangling nodes as virtual outlinks to a virtual node;
the dangling web page processor further calculating a first rank for the crawled nodes and a second rank for the virtual node; and
the dangling web page processor further calculating a third rank for the dangling nodes from the first rank and the second rank; and
a processor for outputting any one or more of the first rank, the second rank, and the third rank.

15. The system of claim 14, wherein the outlinks comprise links that allow navigation on the world wide web from a first page to a second page.

16. The system of claim 14, wherein calculating the first rank for the crawled nodes and the second rank for the virtual node comprises using a reduced eigen-system.

17. The system of claim 14, further comprising a penalty page processor for identifying as penalized nodes that have outlinks to penalty nodes.

18. The system of claim 17, wherein the penalized nodes have associated normal ranks; and
wherein the penalty page processor reduces the normal ranks associated with the penalized nodes.

19. The system of claim 18, wherein the penalty page processor comprises a push-back processor.

20. The system of claim 18, wherein the penalty page processor comprises a self-loop processor.

21. The system of claim 18, wherein the penalty page processor comprises a jump-weighting processor.

22. The system of claim 18, wherein the penalty page processor comprises a rank redistribution processor.

23. A computer program product having a plurality of computer executable instruction codes stored on a computer-readable medium, for ranking a plurality of nodes on a network, including dangling nodes, comprising:
a first set of instruction codes for identifying at least one of the dangling nodes from among a plurality of crawled nodes;
a second set of instruction codes for identifying an outlink from at least one of the crawled nodes to at least one of the dangling nodes;
a third set of instruction codes for considering outlinks from the crawled nodes as virtual outlinks to a virtual node;
a fourth set of instruction codes for calculating a first rank for the crawled nodes and a second rank for the virtual node; and
a fifth set of instruction codes for calculating a third rank for the dangling nodes from the first rank and the second rank; and
a sixth set of instruction codes for outputting any one or more of the first rank, the second rank, and the third rank.

24. The computer program product of claim 23, wherein the outlinks comprise links that allow navigation on the world wide web from a first page to a second page.

25. The computer program product of claim 23, wherein the fourth set of instruction codes calculates the first rank for the crawled nodes and the second rank for the virtual node comprises using a reduced eigen-system.

26. The computer program product of claim 23, further comprising a seventh set of instruction codes for identifying as penalized nodes that have outlinks to penalty nodes;
wherein the penalized nodes have associated normal ranks; and
wherein the normal ranks associated with the penalized nodes are reduced.

27. The computer program product of claim 26, wherein the seventh set of instruction codes comprises a set of push-back instruction codes.

28. The computer program product of claim 26, wherein the seventh set of instruction codes comprises a set of self-loop instruction codes.

29. The computer program product of claim 26, wherein the seventh set of instruction codes comprises a set of jump-weighting instruction codes.

30. The computer program product of claim 26, wherein the seventh set of instruction codes comprises a set of rank redistribution instruction codes.

31. A processor-implemented system installed on a host server for providing a service of ranking a plurality of nodes on a network, including dangling nodes, comprising:
a processor for specifying data for which a ranking is performed;
a processor for specifying a ranking system by which a rank of the dangling nodes is adjusted;
a processor for invoking a dangling node processor utility program, wherein the data and the ranking system are made available to the dangling node processor utility program; and
a processor for outputting a ranking of at least some of the dangling nodes from the data.

32. A processor-implemented method for providing a service of ranking a plurality of nodes on a network, including dangling nodes, comprising:
specifying data for which a ranking is performed;
specifying a ranking system by which a rank of the dangling nodes is adjusted;
invoking a dangling node processor utility program, wherein the data and the ranking system are made available to the dangling node processor utility program; and
outputting a ranking of at least some of the dangling nodes from the data.

* * * * *